United States Patent [19]

Thekdi

[11] 4,167,212
[45] Sep. 11, 1979

[54] DEVICE FOR PREHEATING AIR USED IN COMBUSTION

[75] Inventor: Arvind C. Thekdi, Sylvania, Ohio

[73] Assignee: Midland-Ross Corporation, Cleveland, Ohio

[21] Appl. No.: 811,603

[22] Filed: Jun. 30, 1977

[51] Int. Cl.² ............................................. F28F 3/02
[52] U.S. Cl. .............................. 165/134 R; 122/20 B
[58] Field of Search ............................. 165/159–160, 165/142, 143, 137, 130, 1, DIG. 2, 134, 134 DP; 122/20 B, 412

[56] References Cited

U.S. PATENT DOCUMENTS

| 1,065,837 | 6/1913 | Reichhard | 122/20 B |
| 1,808,619 | 6/1931 | Uhde | 165/160 |
| 1,840,834 | 1/1932 | Davis, Jr. | 122/412 |
| 2,321,132 | 6/1943 | Czava | 165/142 X |
| 4,036,293 | 7/1977 | Tamk et al. | 165/142 X |

Primary Examiner—Samuel Scott
Assistant Examiner—Theophil W. Streule, Jr.
Attorney, Agent, or Firm—Harlan E. Hummer

[57] ABSTRACT

A device which is positionable within a flue for recapturing heat from hot gases exiting the flue. The device comprises a pair of tubes which are disposed in parallel relation longitudinally of the flue. The tubes are formed from cylindrical tubes which have been flattened from a circular to a generally oval cross-sectional configuration. A shield is positioned longitudinally between the two tubes for radiating against the tubes, heat which contacts the shield by convection.

12 Claims, 4 Drawing Figures

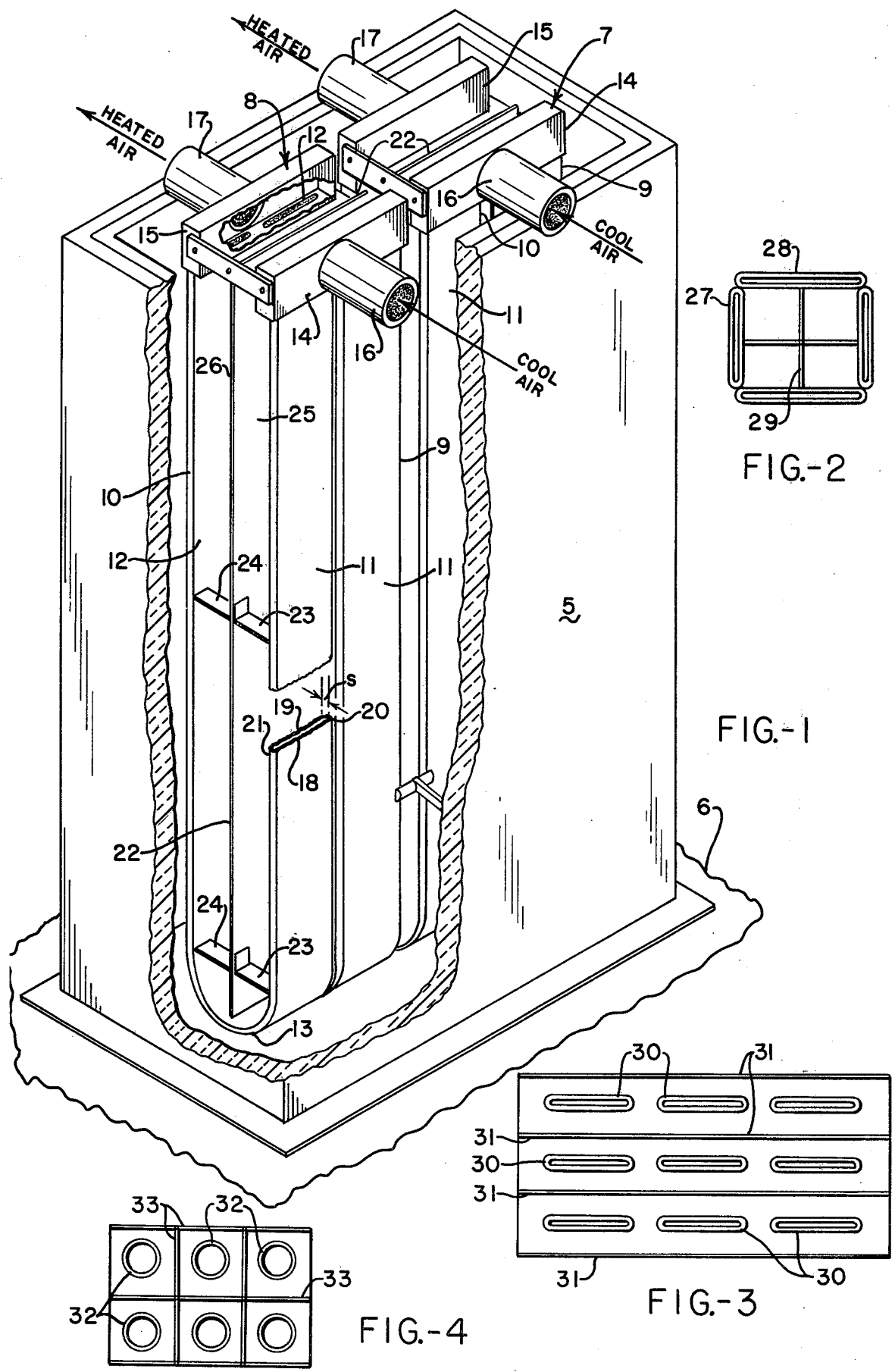

DEVICE FOR PREHEATING AIR USED IN COMBUSTION

BACKGROUND OF THE INVENTION

The invention is particularly well suited for use in the recapturing of heat from hot flue gases to preheat combustion air employed in the apparatus from which the flue gases exit. Flue gases from many industrial furnaces utilizing fossil fuels, such as natural gas, oil or coal, leave the furnace at high temperatures which are slightly above temperatures of the furnace. The heat in flue gases of a typical industrial installation amounts to 30-80 percent of the heat in the furnace. Thus, it is important to recapture as much heat as possible from the exiting flue gases for recycling to the furnace, by using the recaptured heat to preheat the combustion air normally used in the furnace. This is achieved by using devices known as air preheaters or recuperators.

The combustion air of a typical recuperator is passed through a metal or ceramic pipe which is positioned within a stream of hot flue gases. The heat of the hot flue gases is first transferred to the tube and then to the combustion air being circulated in the tube. In such designs, the heat transfer from the hot flue gas to the tube and then to the air, is primarily by convection which is limited by the gas velocity which, in turn, determines the pressure drop across the flue gas side of the recuperator. A high pressure drop on the flue gas side creates within the furnace, a positive pressure which causes problems in the operation and maintenance of the furnace. Another limitation of such recuperators is the fixed ratio of surface area to cross-sectional area of conventional tubes or pipes used in the recuperators. It should be readily apparent that the ratio of the heat transfer surface area to the cross-sectional area of a given size pipe having a circular cross-section, cannot be radically changed, because the cross-sectional area increases as the surface area increases thereby resulting in a lower velocity of the air being circulated in the pipe and consequently a lower coefficient of heat transfer. The invention is designed to overcome such problems.

Briefly stated, the invention is in a device which is disposable in a flue for recapturing heat from flue gases exiting the flue. The device essentially comprises a pair of tubes which are composed of heat conductive material. Means are provided for mounting the tubes in parallel relation longitudinally of the flue, and for circulating a fluid, e.g. air, under pressure, through the tubes. A shield having at least heat radiating surfaces facing the tubes, is disposed longitudinally between the tubes for radiating against the tubes, heat which is received from the hot flue gases.

DESCRIPTION OF THE DRAWING

The following description of the invention will be better understood by having reference to the annexed drawing, wherein:

FIG. 1 is a perspective view of a flue extending from a furnace, and having portions thereof removed to show a preheating device made in accordance with the invention;

FIG. 2 is a plan view of another embodiment of the invention;

FIG. 3 is a plan view of still another embodiment of the invention; and

FIG. 4 is a plan view of still another embodiment of the invention.

DETAILED DESCRIPTION OF THE DRAWING

With reference to FIG. 1, there is shown a flue or stack 5 through which hot exhaust gas exits into the atmosphere from an industrial furnace or oven 6 which utilizes fossil fuels, such as natural gas, oil, or coal, in combination with combustion air.

A preheater of the combustion air, in the form of a pair of individual recuperators 7,8, is disposed within the flue 5 for capturing heat from the hot exhaust, or flue gases passing through the flue 5. The recuperators 7,8, in this instance, each comprise a pair of hollow, U-shaped tube assemblies 9,10, which are adjacently disposed in side-by-side relation. Each of the U-shaped tube assemblies 9,10, in turn, is comprised of a pair of parallel, flattened tubes 11,12 which are connected at one end by a semi-circular, flattened tube portion 13, and at the other end to separate headers 14,15 which are in communication with an entrance inlet 16 and an exit outlet 17, respectively, through which combustion air is circulated to and from the recuperators 7,8. The more closely spaced tubes 11 and 12 of adjacent U-shaped tube assemblies 9,10 are aligned in end-to-end relation.

The U-shaped tube assemblies 9,10 of the recuperators 7,8 are preferably formed from hollow tubes originally having a circular cross-section. The circular section of the U-shaped tube assemblies 9,10 are flattened into an oval shape, and further to a point where each of the tubes 11,12,13 of the U-shaped tube assemblies 9,10 comprises a pair of opposing, flat parallel sides and corresponding surfaces 18,19 which are wide compared to the spacing S between the sides 18,19, and which are joined by semi-circular edges 20,21. The inside, cross-sectional area of each of the tubes 10,11,13 is designed to produce in the air entering and exiting the U-shaped tube assemblies 9,10 of each of the recuperators 7,8, a drop in pressure of from 10 inches of water column (W.C.) to 27 inches of water column, where 27 inches of water column equals one pound per square inch (psi). The U-shaped tube assemblies 9,10 of the recuperators 7,8 are formed of any suitable heat conductive material, e.g. metal.

A shield 22 is positioned longitudinally between the opposing tubes 11,12 of each pair of U-shaped tube assemblies 9,10, by any suitable means, e.g. spacer bars 23,24. The shields 22 are each composed of any appropriate heat radiating material, e.g. metal, or at least provided with heat radiation surfaces 25,26 which are designed to radiate against the individual tubes 11,12, heat which is received from the hot flue gases exiting the flue 5. In some instances, it is desirable to use similar shields adjacent the opposing outer sides 18 of the tubes 11,12, i.e. between the tubes 11,12 and adjacent inner surfaces or walls of the flue 5. The inner walls of the flue 5, in this instance, act as radiation shields for radiating heat against the U-shaped pipes 9,10.

It should be apparent that in larger size recuperators, a number of U-shaped tube assemblies can be mounted, in series, to preheat the combustion air to a desired temperature. In smaller units, it may be sufficient to use a single, flattened tube disposed between a pair of radiation shields. Straight tubes are usually mounted between a pair of fixed supports which do not allow for the expansion of the tubes which fracture adjacent the supports upon repeated flexing. A U-shaped tube assembly is free to expand and is not subject to the flexure stresses encountered by the fixed, straight tubes. For this, and other reasons, a U-shaped tube assembly with a radiation shield therebetween, has been found to be the most effective device for use as a recuperator.

Thus, there has been provided a very simple and economical recuperator which can be used in a flue to recapture heat from hot flue gases exiting the flue. Different configurations can be used. For example, two U-shaped tube assemblies 27,28 (FIG. 2) can be placed at right angles to each other and used in combination with a radiation shield 29 having a cross-shaped, cross-section. Also, a number of rows of individual, flattened tubes 30 (FIG. 3) in aligned end-to-end relation can be used in combination with a pair of radiation shields 31 which sandwich each row of flattened tubes 30 therebetween. Moreover, tubes 32 (FIG. 4), having circular cross-sections and boxed in by radiation shields 33, can be used although the flattened tubes are much more effective for the reasons previously mentioned.

The term "oval", as used herein and in the claims in reference to a tube, means a tube having a pair of opposing, longitudinally extending, transversely curved or flat sides which are more closely spaced together than the curved ends connecting the sides. Thus, an oval shaped tube can have a true oval cross-sectional configuration, or one wherein the pair of closely spaced sides are flat as in the case of a flattened tube made from a regular, cylindrical tube.

What is claimed is:

1. A device which is disposable in a flue for recapturing some of the heat of exhaust gases exiting the flue, comprising:
   (a) a pair of elongated tubes each of which are composed of heat conductive material;
   (b) means for mounting the pair of tubes longitudinally within the flue in parallel relation so that the exhaust gases flow between the pair of tubes in one direction as they exit the flue;
   (c) means for circulating fluid, under pressure, through the tubes; and
   (d) an elongated shield disposed between the pair of tubes and extending longitudinally thereof, the shield having at least one heat radiating surface facing each of the tubes in parallel spaced relationship therewith and designed to radiate against the tubes, heat received by convection from exhaust gases exiting the flue and flowing between the pair of tubes in said one direction, said shield including means for holding the shield in parallel relation with said tubes.

2. The devide of claim 1, wherein the shield has a length and width which is coextensive with the correspondingly measured length and width of the tubes which are similarly sized.

3. The device of claim 1, which includes means for connecting the tubes at one end thereof to form a composite tube having a generally U-shape.

4. The device of claim 3, wherein the composite tube has an oval cross-sectional area designed to produce a 10" W.C. to 27" W.C. pressure drop between fluid entering and exiting the composite tube.

5. The device of claim 4, wherein the composite tube has a corss-section bounded by a pair of opposing, flat, parallel sides connected by semi-circular marginal edges, the spacing between the flat sides being substantially smaller than the spacing between the marginal edges.

6. The device of claim 1, which includes a pair of like shields sandwiching the pair of tubes and other shield therebetween.

7. The device of claim 1, wherein each of the tubes has a circular cross-section and is surrounded by like shields which extend longitudinally of the tubes.

8. In combination:
   (a) an elongated flue through which heated exhaust gases flow longitudinally in one direction as they exit the flue;
   (b) at least one pair of elongated tubes disposed within the flue, each of the tubes being composed of heat conductive material;
   (c) means mounting each pair of tubes longitudinally within the flue in parallel relation so that heated exhaust gases flow between each pair of tubes in said one direction as they exit the flue;
   (d) means for circulating fluid, under pressure, through the tubes; and
   (e) an elongated shield disposed between each pair of adjacent tubes and extending longitudinally thereof, the shield having at least one heat radiating surface facing each of the tubes and parallel therewith in equidistantly spaced relationship and designed to radiate against the tubes, heat received by convection from the exhaust gases flowing in said one direction between each pair of adjacent parallel tubes, said shield including means for holding the shield in parallel relation with said tubes.

9. The combination of claim 8, which includes a semi-circular tube connecting the pair of tubes at one end thereof to form a composite tube having a generally U-shape.

10. The combination of claim 9, wherein each composite tube has a cross-section bounded by a pair of opposing, flat parallel sides connected by semi-circular marginal edges, the spacing between the flat sides being substantially smaller than the spacing between the marginal edges, and the cross-sectional area of the composite tube being such that there is a pressure drop between fluid entering and exiting the composite tube of from 10" W.C. to 27" W.C.

11. The combination of claim 10, wherein the shield has a length and width which is coextensive with the correspondingly measured length and width of each of the pair of tubes which are similarly sized.

12. The combination of claim 11, which includes a second, like composite tube mounted side-by-side, in U-shaped alignment with the first composite tube, and a shield laterally spanning the second composite tube, and a pair of separate headers connected to opposing open ends of the composite U-shaped tubes and disposed in communication with entrance inlets and exit outlets, whereby air, under pressure, is circulated separately through the composite tubes.

* * * * *